(12) United States Patent
Bertucci et al.

(10) Patent No.: US 9,293,745 B2
(45) Date of Patent: Mar. 22, 2016

(54) FUSED COVER ASSEMBLY FOR BATTERY SYSTEM

(75) Inventors: Joseph A. Bertucci, Farmington Hills, MI (US); John V. Caputo, Canfield, OH (US); Wesley W. Weber, Jr., Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 846 days.

(21) Appl. No.: 13/584,979

(22) Filed: Aug. 14, 2012

(65) Prior Publication Data

US 2014/0050944 A1 Feb. 20, 2014

(51) Int. Cl.
| | |
|---|---|
| *H01M 14/00* | (2006.01) |
| *H01M 10/34* | (2006.01) |
| *H01M 10/52* | (2006.01) |
| *H01M 2/04* | (2006.01) |
| *H01M 2/20* | (2006.01) |
| *H01M 10/42* | (2006.01) |
| *H01M 2/08* | (2006.01) |

(52) U.S. Cl.
CPC ............ *H01M 2/0434* (2013.01); *H01M 2/206* (2013.01); *H01M 10/4257* (2013.01); *H01M 2/08* (2013.01); *H01M 2220/20* (2013.01)

(58) Field of Classification Search
USPC .................................. 429/7, 149, 170, 59, 61
IPC ................................................. H01M 2200/103
See application file for complete search history.

(56) References Cited

U.S. PATENT DOCUMENTS

| | | | | |
|---|---|---|---|---|
| 5,146,150 | A | * | 9/1992 | Gyenes et al. ................ 320/112 |
| 5,885,731 | A | * | 3/1999 | Shannon et al. .............. 429/175 |
| 6,249,063 | B1 | | 6/2001 | Rudoy et al. |
| 7,538,519 | B2 | | 5/2009 | Daou et al. |
| 8,062,784 | B2 | * | 11/2011 | Oriet et al. .................... 429/158 |
| 2009/0261786 | A1 | | 10/2009 | Hsu et al. |
| 2010/0173179 | A1 | | 7/2010 | Matthias |
| 2011/0171505 | A1 | * | 7/2011 | Kishll et al. .................... 429/82 |
| 2011/0228436 | A1 | | 9/2011 | Lee et al. |

* cited by examiner

*Primary Examiner* — Patrick Ryan
*Assistant Examiner* — Julian Anthony
(74) *Attorney, Agent, or Firm* — Lawrence D. Hazelton

(57) ABSTRACT

A fused cover assembly for a battery system. The fused cover assembly includes an attachment means configured to attach the assembly to a battery formed of a plurality interconnected cells, and a plurality of fused connections configured to make electrical contact with the interconnected cells and thereby provide a sense connection to the cells of the battery that is fused. If the sense connection to the battery cells is short-circuited, a fuse device open-circuits to protect the cell from being damaged.

7 Claims, 6 Drawing Sheets

FUSED COVER ASSEMBLY FOR BATTERY SYSTEM

TECHNICAL FIELD OF INVENTION

This disclosure generally relates to battery systems, and more particularly relates to a fused cover assembly that provides fused sense connections to individual cells of a battery.

BACKGROUND OF INVENTION

Battery systems for hybrid vehicles and electric only vehicles that monitor the voltages of individual cells of a battery cell stack have been proposed. Individual cells are monitored by way of sensing lines routed from the battery assembly to a battery controller that processes cell voltage inputs, and manages the charging of the battery based on these measurements. The sensing lines or sensing connections are low current voltage sensing connections to the cells that conduct, for example, less than one milli-Ampere (<1 mA). However, the sensing lines or sensing connection are exposed to a potential risk of short circuit if the harness is damaged or otherwise compromised, for example following a vehicle collision. United States Patent Application Publication No.: US 2009/0261786 A1 published Oct. 22, 2009 by Hsu et al. and United States Patent Application Publication No.: US 2011/0228436 A1 published Sep. 22, 2011 by Lee et al. show examples of battery systems that do not provide for short-circuit protection of the sensing connections between a battery and a controller.

SUMMARY OF THE INVENTION

Described herein is a way to provide voltage sensing connections to cells of a battery that are fused in order to protect the cells from being short-circuited.

In accordance with one embodiment, a fused cover assembly is provided. The assembly includes an attachment means and a plurality of fused connections. The attachment means is configured to attach the assembly to a battery formed of a plurality of interconnected cells. The plurality of fused connections is configured to make electrical contact with the interconnected cells and thereby provide a sense connection to the cells of the battery that is fused.

In one embodiment, one or more of the fused connections includes a fuse device located within the assembly. The fuse device is configured to open-circuit the corresponding sense connection when excessive current flows through the fuse device.

In another embodiment, a battery system is provided. The battery system includes a battery and a fused cover assembly. The battery is formed of a plurality of cells electrically coupled by interconnections to form the battery. The fused cover assembly is configured to attach to the battery. The assembly includes a plurality of fused connections configured to make electrical contact with the interconnections and thereby provide a sense connection to the cells of the battery that is fused.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
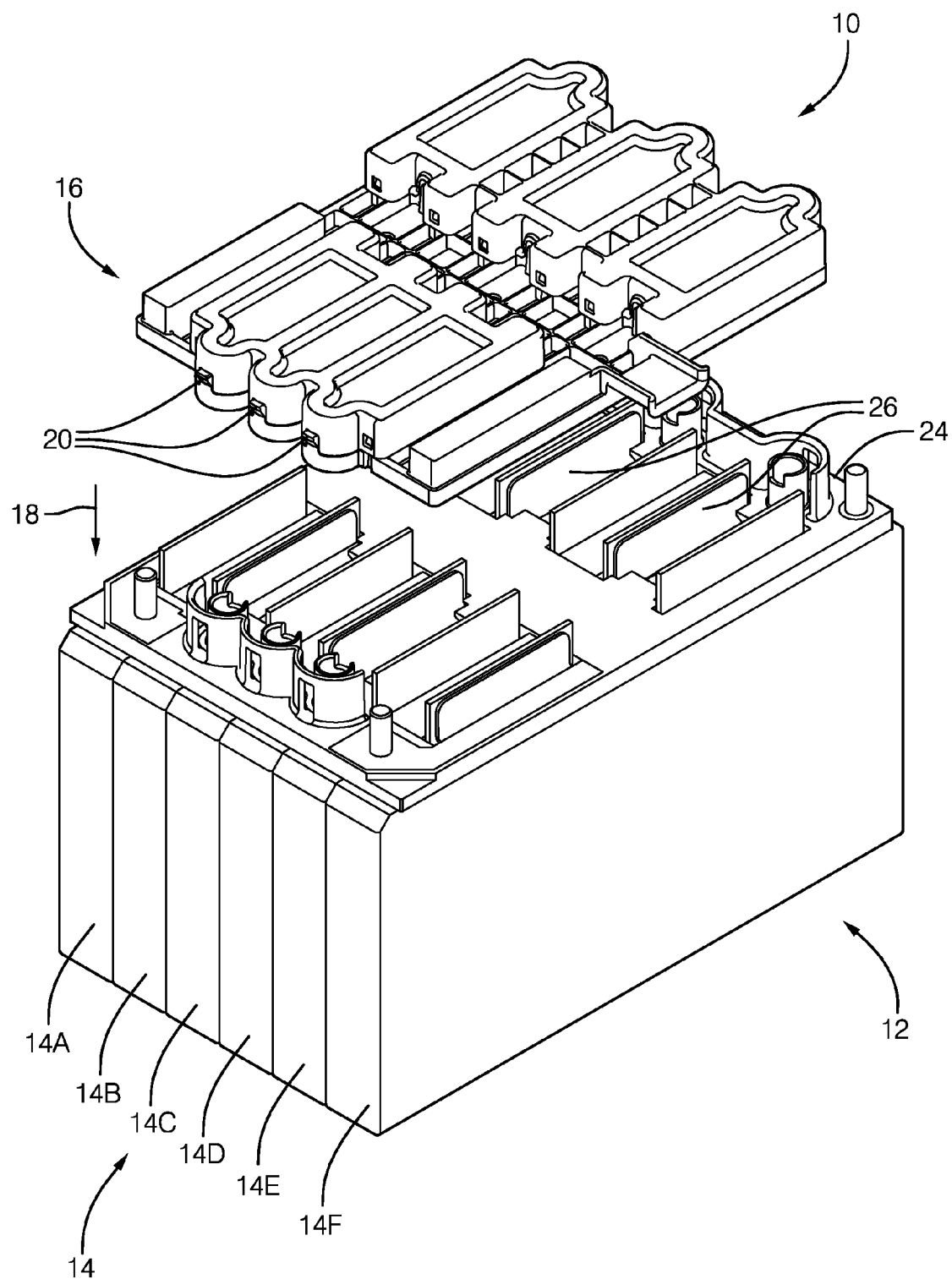
FIG. 1 is a perspective view of a battery system that include a fused cover assembly in accordance with one embodiment.

FIG. 1 illustrates a non-limiting example of a battery system, hereafter the system 10. In general, the system 10 includes a battery 12 formed of a plurality of cells 14, for example cell 14A, 14B, 14C, 14D, 14E, and 14F. In this example, the battery 12 is illustrated as having six cells. However, it is contemplated that the teachings set forth herein are applicable to batteries with more or less than six cells. The cells 14 are rechargeable, and it is recognized that it may be preferable to monitor an individual cell voltage of each cell 14A, 14B, 14C, 14D, 14E, and 14F while charging the battery 12 or drawing electrical power from the battery 12

The system 10 includes a fused cover assembly, hereafter the assembly 16. The assembly 16 is generally configured to attach to the battery 12. FIG. 1 illustrates the assembly 16 prior to being installed on the battery 12. The assembly 16 is installed by placing the assembly 16 onto the battery 12 as indicated by arrow 18. The assembly 16 may include attachment means such as snap fit features or tabs 20 that help to hold the assembly 16 in place after being assembled to the battery 12. Alternatively, the assembly 16 may be held in place by, for example, screws, adhesive, or other fastening means known in the art. As will become clear in the description that follows, the assembly 16 generally provides a way to make an electrical connection to each of the cells 14 for sensing individual cell voltages, where those electrical connections are protected from being shorted together or being shorted to a vehicle chassis. Providing short circuit protection is considered advantageous as it may prevent damage to the cells 14, the battery 12, or the vehicle in which the system 10 is installed.

The system 10 may also include a bussing plate 24 that is generally configured to interconnect electrically the cells 14 in a manner effective to form electrically the battery 12. The bussing plate 24 may include other features that will be discussed in further detail below to facilitate the mechanical coupling of the cells 14, and provide interconnections 26 (FIG. 3) that interconnect electrically the cells 14 forming the battery 12 and interconnect the assembly 16 to the battery 12.

Figure 2:
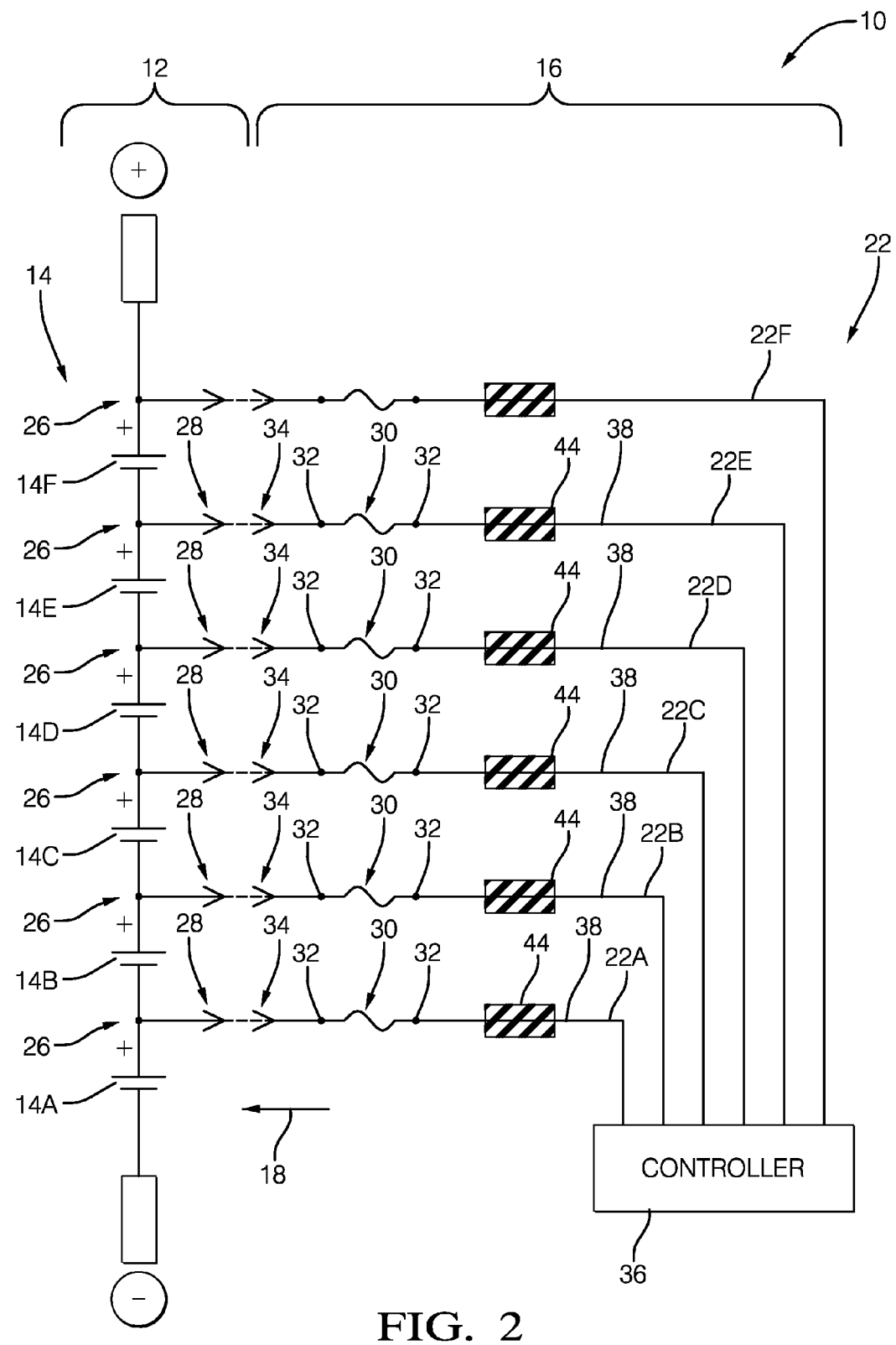
FIG. 2 is schematic of the battery system of FIG. 1 in accordance with one embodiment.

FIG. 2 illustrates a non-limiting example of a schematic that generally corresponds to the system 10. The assembly 16 includes a plurality of fused connections 22, for example fused connection 22A, 22B, 22C, 22D, 22E, and 22F. In general, the fused connections 22 are configured to make electrical contact with the interconnections 26 and thereby provide a sense connection or sensing line to the cells 14 of the battery 12 that is fused. As used herein, fused means that if excessive current, for example more than one Ampere (1 A) is drawn through a fused connection, the sense connection is open-circuited in order to stop the current. The fused connections 22 may include a fuse device 30 located within the assembly 16 and configured to open circuit the corresponding sense connection (e.g. fused connection 22A, 22B, 22C, 22D, 22E, or 22F) when excessive current flows through the fuse device 30. By way of example, the fuse device 30 may be a typical melting type fuse that has a thin conductor or metal filament that melts when excessive current is passed through the melting type fuse and thereby open-circuits the fused connection. Alternatively, the fuse device 30 may be a semiconductor device that senses current, creates an open circuit when excessive current is present, and resets periodically or in response to a reset signal (not shown) from a controller 36. Alternatively, the fuse device 30 may be an electro-mechanical relay coupled to a control circuit (not shown) that senses current in the fused connection.

The controller 36 may include a processor (not shown) such as a microprocessor or other control circuitry as should be evident to those in the art. The controller 36 may include memory (not shown), including non-volatile memory, such as electrically erasable programmable read-only memory (EEPROM) for storing one or more routines, thresholds and captured data. The one or more routines may be executed by the processor to perform steps for determining if signals received by the controller 36 indicate, for example, that one or more of the cells 14 is under-charged, over-charged, or may be damaged.

Figure 3:
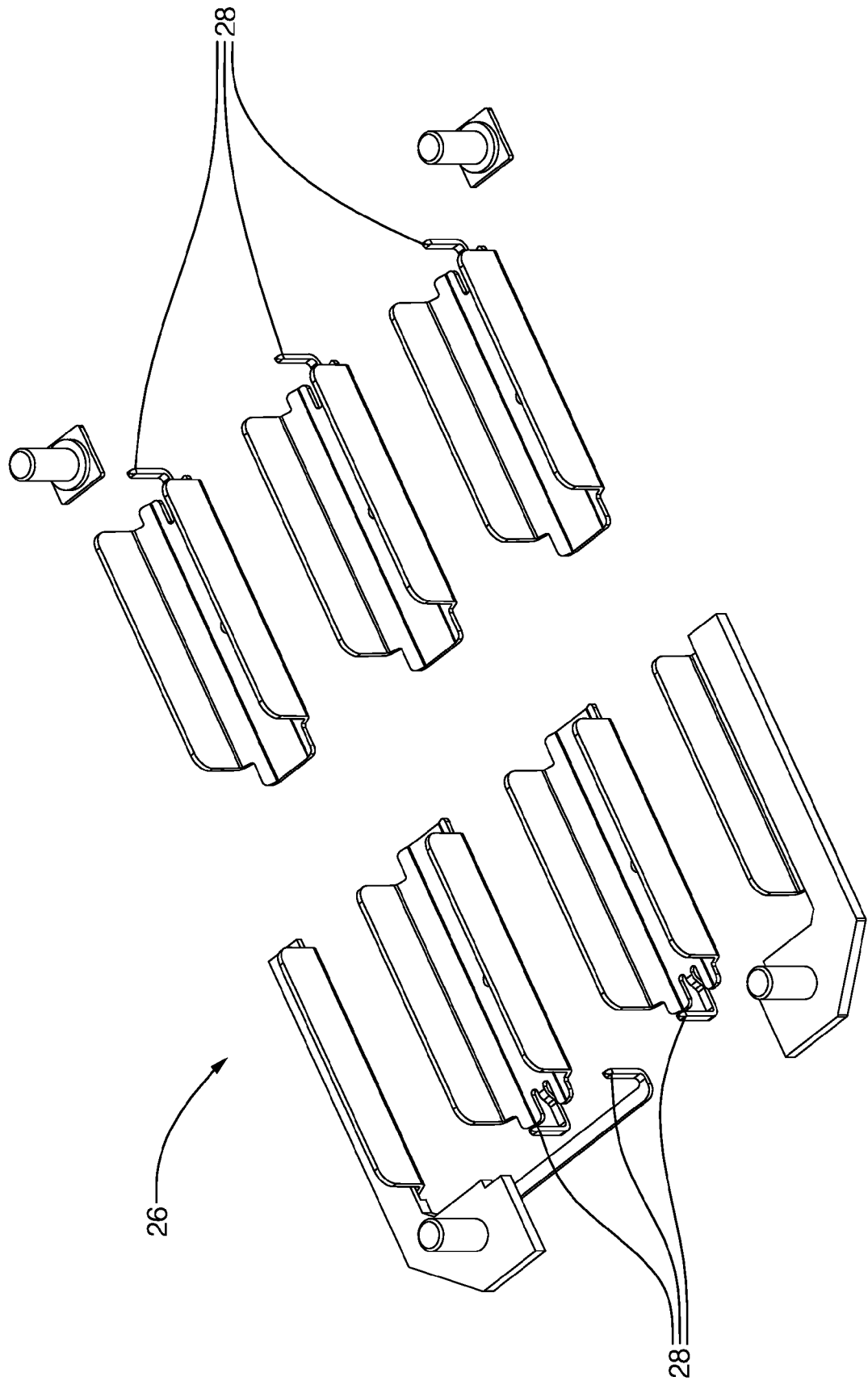
FIG. 3 is a perspective view of interconnections present in the battery system of FIG. 1 in accordance with one embodiment.

FIG. 3 illustrates a non-limiting example of the interconnections 26 without the supporting structure that forms the remaining part of the bussing plate 24. In this example, the interconnections 26 include terminal pins 28 configured to make electrical contact from the cells 14 to the fused connections 22. In general, the terminal pins 28 are accessible features of the bussing plate 24 so that an electrical connection can be made between the cells 14 and the fused connections 22 when the assembly 16 is placed on the bussing plate 24. In other words, the bussing plate 24 includes the plurality of interconnects 26 configured to interconnect the cells 14 to form the battery 12, and define one or more terminal pins 28.

Figure 4:
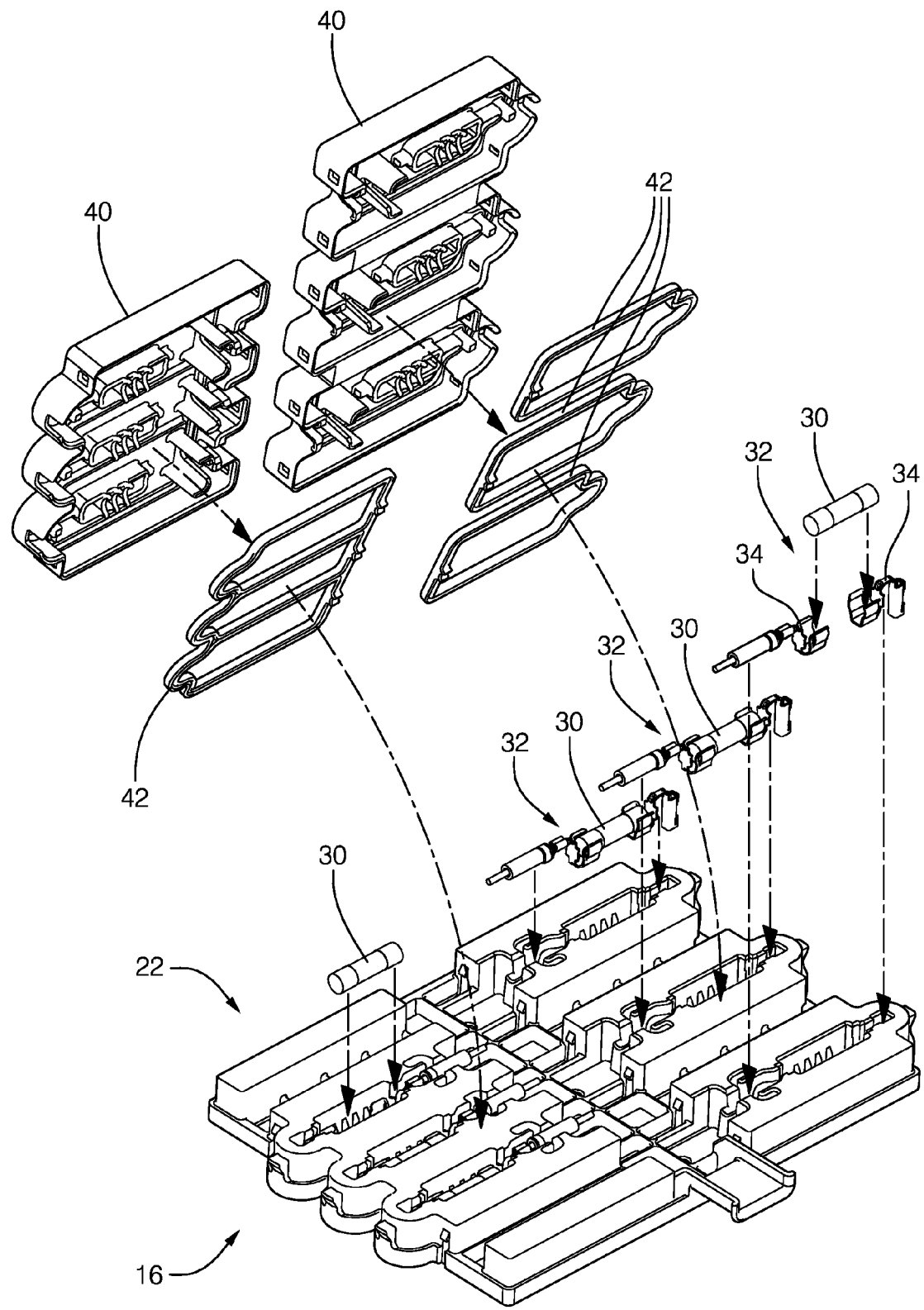
FIG. 4 is a perspective exploded view of the fused cover assembly of FIG. 1 in accordance with one embodiment.

FIG. 4 further illustrates non-limiting features of the assembly 16. In general, the assembly 16 includes a plurality of fused connections 22 configured to make electrical contacts with the cells 14 (FIG. 1), where the fused connections 22 are fused. In this example, the fuse device 30 is illustrated as the well-known glass tube fuse that may be preferable when a low height of the assembly 16 is desired. Alternatively, the well-known blade fuse may be used when other packaging constraints are imposed. The assembly 16 may include a fuse holder 32 configured to support and make electrical contact with the cells 14. Preferably, the fuse device 30 snap fits into the fuse holder 32 after the fuse holder 32 is installed into the assembly 16. Alternatively, the fuse device may be soldered to the fuse holder 32 prior to being assembled into the assembly 16. Part of the fuse holder 32 may form a terminal connector 34 configured to cooperate with the terminal pin 28 (FIG. 3) in order to make electrical contact with the cells 14 via the interconnections 26 when the assembly 16 is installed onto the battery 12.

The assembly 16 may include a cap 40 configured to physically protect the fuse device 30, the fuse holder 32, or other features of the assembly 16. The cap 40 may be formed of a number of polymeric compounds suitable for vehicle applications. The cap 40 may be attached to the assembly 16 by way of, for example, adhesive (not shown), sonic welding, snap fit features, or other means known in the art. The assembly may also include a gasket 42 to better seal the interface between the cap 40 and the assembly 16 against intrusion by water or other chemicals that may damage the fuse device 30, the fuse holder 32, or other features of the assembly 16. The gasket 42 may be formed of, for example, a silicone compound suitable for vehicle applications.

Figure 5:
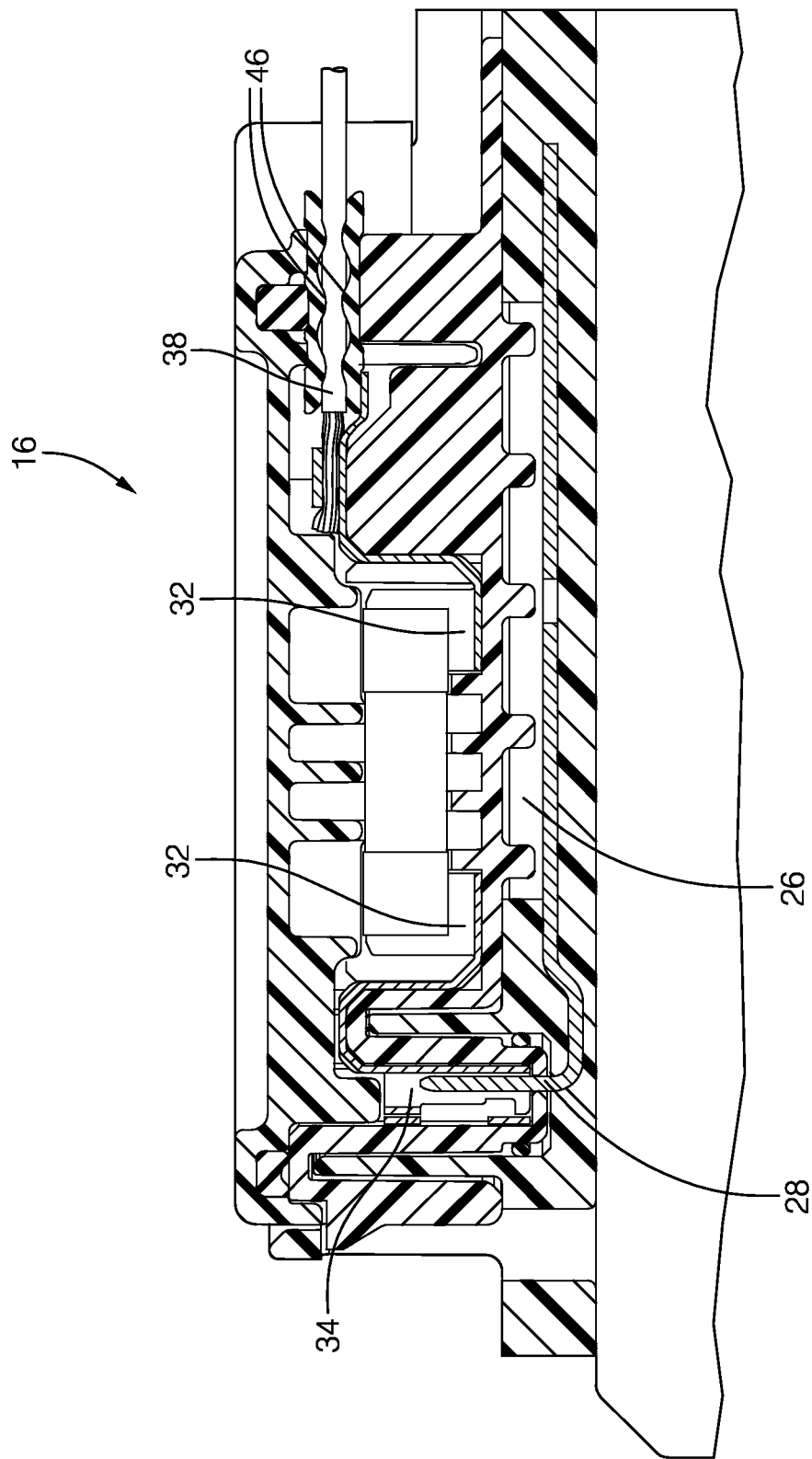
FIG. 5 is a sectional side view of the fused cover assembly of FIG. 1 in accordance with one embodiment.

FIG. 5 further illustrates non-limiting features of the assembly 16. The fuse holder 32 may also be configured to make an electrical connection with a wire 38 that may be part of a wiring harness (not shown) so that the fused connections 22 can be extended beyond the assembly 16 to, for example, make electrical contact with the controller 36 (FIG. 2). The assembly 16 may include a silicone seal 44 around the wire 38 and configured to cooperate with the assembly 16 in a manner effective resist moisture intrusion present outside of the assembly 16 from contacting the fuse device 30, the fuse holder 32, or other features of the assembly 16 by migrating along the wire 38. The assembly 16 may include one or more ribs 46 in contact with the silicone seal 44 effective to increase locally the sealing pressure for better sealing by the silicone seal 44.

Figure 6:
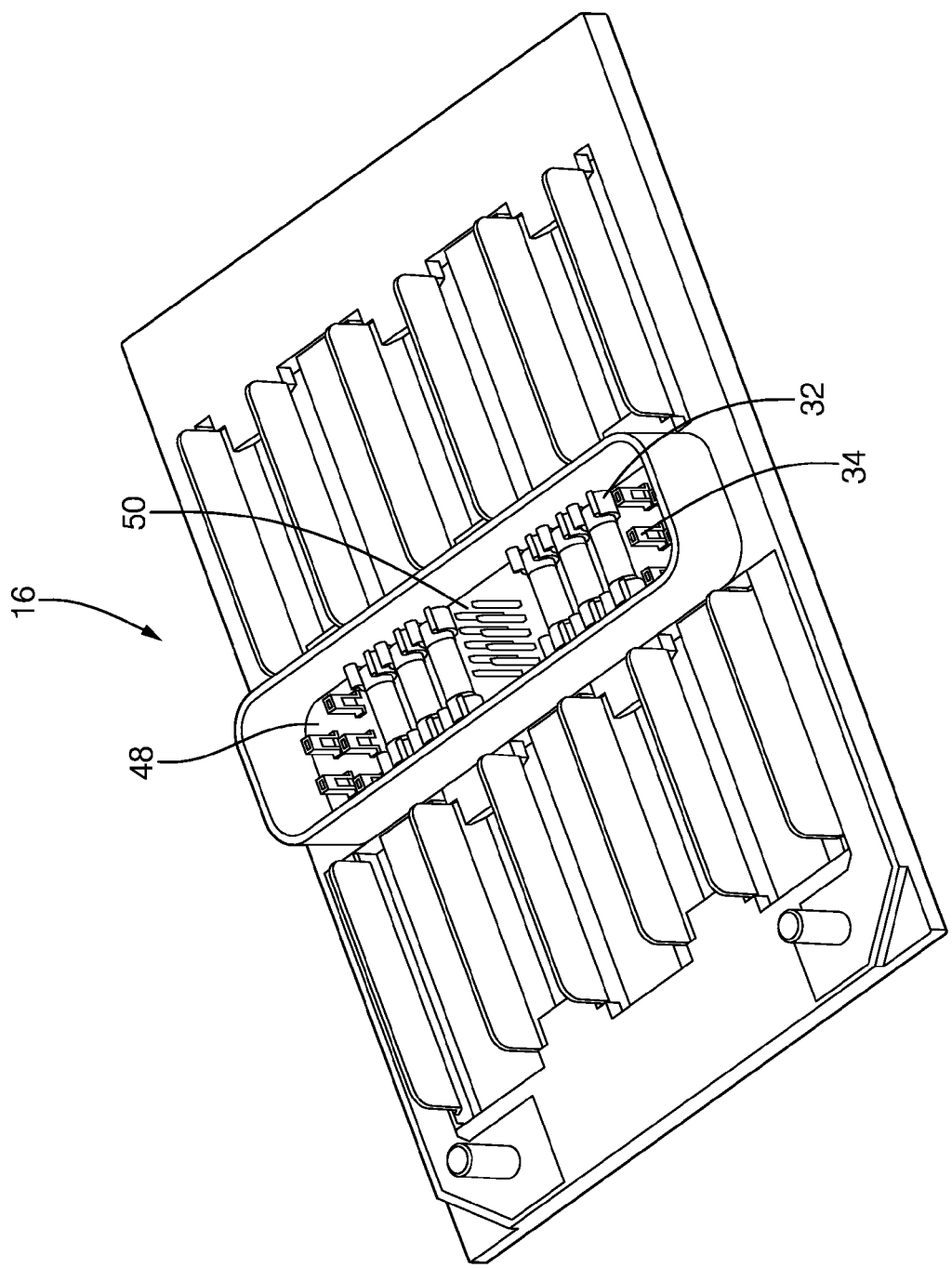
FIG. 6 is a perspective exploded view of an alternative embodiment of the fused cover assembly of FIG. 1 in accordance with one embodiment.

FIG. 6 illustrates a non-limiting example of an alternative embodiment of the assembly 16 that includes a circuit board assembly (CBA) 48 configured to support the fuse device 30 and make electrical contact with the cells 14 (FIG. 1). In general, the CBA 48 includes similar features to the previously described embodiment such as the fuse holder 32 and the terminal connector 34. In this example, instead of wire 38 (FIG. 5), the assembly 16 provides a connector pin array so that a wire harness (not shown) with a suitable connector on one end can be attached to the assembly 16 to, for example, provide an electrical connection to a controller 36 (FIG. 2). This alternative embodiment may be advantageous for manufacturing reasons as the CBA 48 may be more easily assembled by automated equipment as compared to the previously described embodiment shown in FIG. 4.

It is contemplated that the fused connections 22 could be used by the controller 36 to level the charging or state of charge of each of the cells 14. For example, if during the charging process one or more of the cells 14 are charged to a voltage greater than desired by the common charging current through the battery terminals, individual cells that are overcharged can be discharged individually by the controller via the fused connections 22. Similarly, if a particular cell is undercharged, the controller 36 could top-off that particular cell. The charging or discharging current through the fused connections 22 would be controlled or limited so as not to exceed the current rating of the fuse device 30.

Accordingly, a battery system (the system 10), a fused cover assembly (the assembly 16) is provided. Sensing connections for low current sensing of cell voltages are fused to protect against short-circuit damage to the cells 14 of the battery 12. If the fuse device 30 becomes open-circuit, the fuse device 30 being open-circuit generally does not inhibit the battery 12 from providing power or being charged. The fuse device 30 being open circuit only inhibits sensing of the cell voltage. As such, prior art showing fuses that interrupt or otherwise change the voltage or power output by the battery are not comparable to how the fuse device 30 is used by the system 10 or assembly 16 described herein.

While this invention has been described in terms of the preferred embodiments thereof, it is not intended to be so limited, but rather only to the extent set forth in the claims that follow.

We claim:

1. A fused cover assembly comprising:
   an attachment means configured to attach the assembly to a battery formed of a plurality of interconnected cells;
   a plurality of fuse devices, each fuse device having a first terminal and a second terminal, each fuse device operable conduct current between the first terminal to the second terminal when excessive current does not flow through the fuse device, and open circuit when excessive current flows through the fuse device thereby blocking current between the first terminal to the second terminal, each first terminal connected to one each of a terminal of each of the interconnected cells; and a plurality of fused connections, each fused connection connected to one each of the second terminal of each of the fuse devices, said plurality of fused connection thereby configured to make electrical contact with each of the interconnected cells and thereby provide a sense connection to each of the cells of the battery that is configured to open-circuit the corresponding sense connection when excessive current flows through the fuse device.

2. The assembly in accordance with claim 1, wherein the assembly includes a fuse holder configured to support the fuse device and make electrical contact with the cells.

3. The assembly in accordance with claim 1, wherein the assembly includes a circuit board assembly configured to support the fuse device and make electrical contact with the cells.

4. The assembly in accordance with claim 1, wherein the assembly includes a silicone seal configured to resist moisture intrusion present outside of the assembly from contacting the fuse device.

5. A battery system comprising:

a battery formed of a plurality of cells electrically coupled by interconnections to form the battery; and a fused cover assembly configured to attach to the battery, said assembly comprising a plurality of fuse devices, each fuse device having a first terminal and a second terminal, each fuse device operable conduct current between the first terminal to the second terminal when excessive current does not flow through the fuse device, and open circuit when excessive current flows through the fuse device thereby blocking current between the first terminal to the second terminal, each first terminal connected to one each of a terminal of each of the interconnected cells, and a plurality of fused connections, each fused connection connected to one each of the second terminal of each of the fuse devices, said plurality of fused connection thereby configured to make electrical contact with each of the interconnections and thereby provide a sense connection to each of the cells of the battery that is configured to open-circuit the corresponding sense connection when excessive current flows through the fuse device.

6. The system in accordance with claim 5, wherein the system includes a bussing plate configured to interconnect the cells in a manner effective to form the battery.

7. The system in accordance with claim 6, wherein the bussing plate includes the plurality of interconnects configured to interconnect the cells to form the battery, and define a terminal pin configured to make electrical contact from the cells to the fused connections.

* * * * *